March 18, 1947. W. E. LAKE 2,417,601
DEVICE FOR KILLING RODENTS BY ELECTRICITY
Filed July 10, 1944
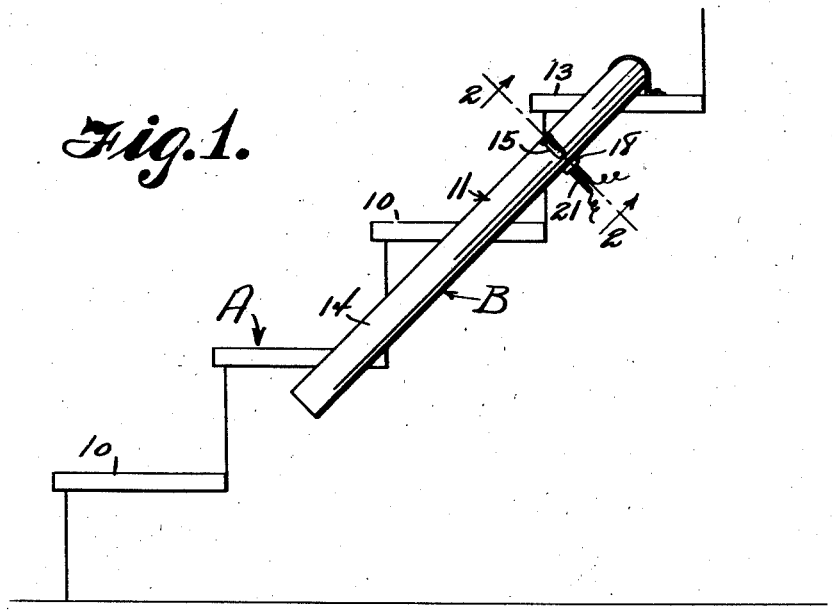
Fig. 1.
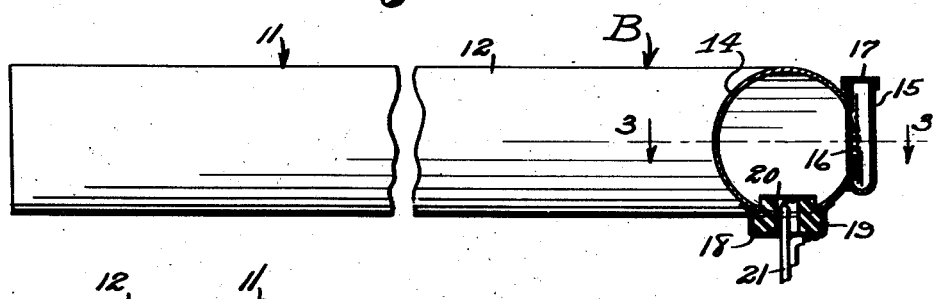
Fig. 2.
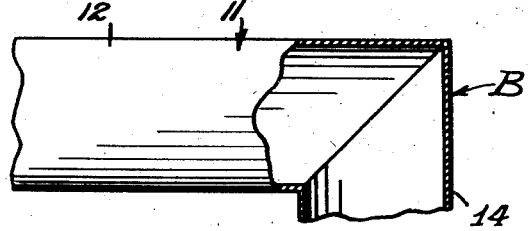
Fig. 3.
INVENTOR.
Wilbur E. Lake
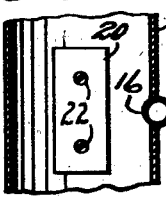
BY Victor J. Evans & Co.
ATTORNEYS Patented Mar. 18, 1947

2,417,601

UNITED STATES PATENT OFFICE 2,417,601

DEVICE FOR KILLING RODENTS BY ELECTRICITY

Wilbur E. Lake, Fostoria, Mich.

Application July 10, 1944, Serial No. 544,223

4 Claims. (Cl. 43—99)

The invention relates to a trap and more especially to a rodent's electric trapping device.

The primary object of the invention is the provision of a device of this character, wherein a conduit has a bait container therein for attracting rodents within the conduit, so that when the said rodents reach a determined point within such conduit they become electrified, thus becoming killed, and fall from within such conduit, thereby relieving it from any unsanitary results, and in this manner eliminating any disagreeable odors.

Another object of the invention is the provision of a trap of this character, wherein the construction thereof is novel and unique, it being placeable upon steps or at any convenient location for attracting rodents, and these being exterminated in a quick and positive manner through electrocution under the working of such trap.

A further object of the invention is the provision of a trap of this character, wherein the killed animals will be gravitated from within the trap, thus maintaining it thoroughly sanitary and effective in the working thereof for the extermination of rodents, either within or without an edifice.

A still further object of the invention is the provision of a trap of this character, which is simple in construction, thoroughly reliable and efficient in operation, strong, durable, readily and easily applied in place, automatic in the working thereof, electrically operated, and inexpensive to manufacture and install.

With these and other objects in view, the invention consists in the features of construction, combination and arrangement of parts as will be hereinafter more fully described, illustrated in the accompanying drawing, which shows the preferred embodiment of the invention and pointed out in the claims hereunto appended.

In the accompanying drawing:

Figure 1 is a fragmentary elevation of steps of an edifice showing the trap constructed in accordance with the invention applied in a workable position thereon.

Figure 2 is a sectional view taken on the line 2—2 of Figure 1 looking in the direction of the arrows.

Figure 3 is a sectional view taken on the line 3—3 of Figure 2 looking in the direction of the arrows.

Similar reference characters indicate corresponding parts throughout the several views in the drawing.

Referring to the drawing in detail, A designates generally a portion of a stairway, having the steps 10, while B denotes in entirety the trap constructed in accordance with the invention.

The trap B comprises an elbow pipe 11, one of its arms or branches 12 is disposed horizontally on the tread piece 13 of the steps 10 to be disposed at an elevation, while the other branch 14 is arranged at right angles to the branch 12 in substantially the same plane as branch 12 and when in operative position is adapted to depend vertically at one end of this tread piece 13, as best seen in Figure 1 of the drawing.

Within the vertically inclined branch 14 close to the crotch of the elbow formation of the pipe 11 is a bait container 15, which has a perforated side wall 16 opening into the interior of the conduit formed by the pipe 11, and suitable bait is introduced into the container 15 by removing the cap 17 thereto, which is exterior of the conduit, the cap being preferably screw threaded on the open end of the container.

Positioned on the side adjacent the container 15 is a housing 18 having within an insulating block 19, and covering this latter is an electric contact plate 20 which is secured thereto by means of fasteners 22 as shown in Figure 3, the plate 20 with the housing 18 being in electrical connection with an electric current supply line conductor 21 leading from any source of current energy.

In the working of the trap when a rodent enters the pipe 11 and on reaching the bait in the container 15, by the contact of its fur or any other part of its body with the plate 20 and branch 14, the electric current supply electrocutes the rodent, and by gravity it is dropped from within the trap to without the same. The bait within the container is aromatic and of ingredients having powerful appeal to rodents, its odor comes out into the conduit, and the branch being inclined, the natural air circulation carries the attractive odor up and out through the horizontal branch of such conduit.

As the rodent seeks the source of the enticement, it establishes the necessary contact between the plate 20 and the branch 14 of the conduit for electrocution.

From the foregoing, it is thought that the construction and manner of use of the trap will be clearly understood and therefore a more extended explanation has been omitted for the sake of brevity.

It is, of course, understood that changes, variations and modifications may be made in the invention, as fall properly within the scope of the claims hereunto appended, without departing from the spirit of the invention or sacrificing any of its advantages.

What is claimed is:

1. A trap of the kind described, comprising an elbow pipe forming right angularly directed runs of a conduit, a bait container within one branch of the pipe for admitting odor within said conduit, an electrically charged contact within the conduit adjacent the container and an electric conductor connected to the pipe.

2. A trap of the kind described, comprising an elbow pipe forming right angularly directed runs of a conduit, a bait container within one branch of the pipe for admitting odor within said conduit, an electrically charged contact within the conduit adjacent the container, a removable cap on the container exteriorly of the conduit and an electric conductor connected to the pipe.

3. A trap of the kind described, comprising an elbow pipe forming right angularly directed runs of a conduit, a bait container within one branch of the pipe for admitting odor within said conduit, an electrically charged contact within the conduit adjacent the container, a removable cap on the container exteriorly of the conduit, the other branch being horizontally disposed with relation to the first mentioned branch and an electric conductor connected to the pipe.

4. A trap comprising an elbow pipe the arms of which are substantially at right angles to each other, a bait container associated with and having communicating relation with one of the arms, an electrocuting contact within one of the arms and adjacent the bait container, and an electric conductor connected with the pipe.

WILBUR E. LAKE.

REFERENCES CITED

The following references are of record in the file of this patent:

UNITED STATES PATENTS

| Number | Name | Date |
|---|---|---|
| 2,160,986 | Rafferty et al. | June 6, 1939 |
| 2,003,513 | Myers | June 4, 1935 |
| 1,059,358 | Griffith | Apr. 22, 1913 |
| 1,738,623 | Westerlund | Dec. 10, 1929 |
| 2,302,787 | Meeham | Nov. 24, 1942 |
| 2,218,403 | McKee | Oct. 15, 1940 |

FOREIGN PATENTS

| Number | Country | Date |
|---|---|---|
| 426,499 | British | Apr. 4, 1935 |
| 354,066 | French | July 17, 1905 |